United States Patent
Cerveny et al.

[15] 3,704,025
[45] Nov. 28, 1972

[54] FOLDING CART
[72] Inventors: Daniel H. Cerveny, 4886 Noyes, San Diego, Calif. 92109; Perry T. Johnson, 5588 Chelsea Street, La Jolla, Calif. 92037; Donald H. Gaston, 3066 McGraw, San Diego, Calif. 92117
[22] Filed: July 23, 1971
[21] Appl. No.: 165,532

[52] U.S. Cl. ............. 280/41 A, 280/47.19, 280/47.2, 280/47.26, 280/47.34, 297/DIG. 4
[51] Int. Cl. ............................................. B62b 11/00
[58] Field of Search ...... 280/47.2, 36 B, 41 A, 47.24, 280/47.35, 47.38, 47.19; 297/DIG. 4, 129

[56] References Cited
UNITED STATES PATENTS
2,685,325   8/1954   Webster ................. 280/41 A
3,647,236   3/1972   Hayes ..................... 280/47.2

Primary Examiner—Benjamin Hersh
Assistant Examiner—David M. Mitchell
Attorney—Warren H. F. Schmieding

[57] ABSTRACT

A folding cart that includes a front frame, a rear frame pivotally connected with the front frame, rollers or wheels on both frames, a seat pivotally attached to both frames for supporting an occupant, and a third frame pivotally attached to the rear frame and movable to a forward position to function as a stabilizer for the cart when the front and rear frames are in partly folded position and is movable to an upright position when the front and rear frames are in completely folded position when the cart is being shipped or stored side by side with other like carts.

6 Claims, 5 Drawing Figures

PATENTED NOV 28 1972

INVENTOR.
DANIEL H. CERVENY
PERRY T. JOHNSON
DONALD H. GASTON

BY Attorney
Warren H F Schmieding

INVENTOR.
DANIEL H. CERVENY
PERRY T. JOHNSON
DONALD H. GASTON

FOLDING CART

BACKGROUND OF THE INVENTION

1. Field of the Invention

The invention comprises carts having front and rear frames that are pivotally connected with one another and are pivotally connected with a seat. These frames and seat are foldable upon one another to conserve storage space.

2. Description of the Prior Art

The prior art in general shows the foldable carts and such art is disclosed in the patents to Binder, U.S. Pat. No. 2,545,336; Wells, U.S. Pat. No. 2,883,731; Beaurline, U.S. Pat. No. 2,957,700; and Stehman et al. U.S. Pat. No. 3,041,084. The prior art does not disclose a third frame that can function as a support for the cart when the cart is partly folded and which third frame can be tilted to an upright position when the front and rear frames are in complete folded position.

SUMMARY OF THE INVENTION

The cart includes a font and rear frame pivotally connected with one another through a pair of links. A seat is pivotally connected to both frames in a manner which it is in occupant-supporting position when the front and rear frames are spread. Each frame includes a pair of legs carrying rollers or wheels. A stabilizing frame is pivotally connected to the lower portion of the rear frame. It can be moved to a position lying forwardly of the front frame for stabilizing the cart when the frames are in partly folded position, and it can be moved to an upright position at the rear of the rear frame for completely folding the cart.

Other features and the advantages of the present invention will be apparent from the following description, reference being made to the accompanying drawings wherein a preferred embodiment of the invention is illustrated.

DESCRIPTION OF THE PREFERRED EMBODIMENT

Figures 1, 2:
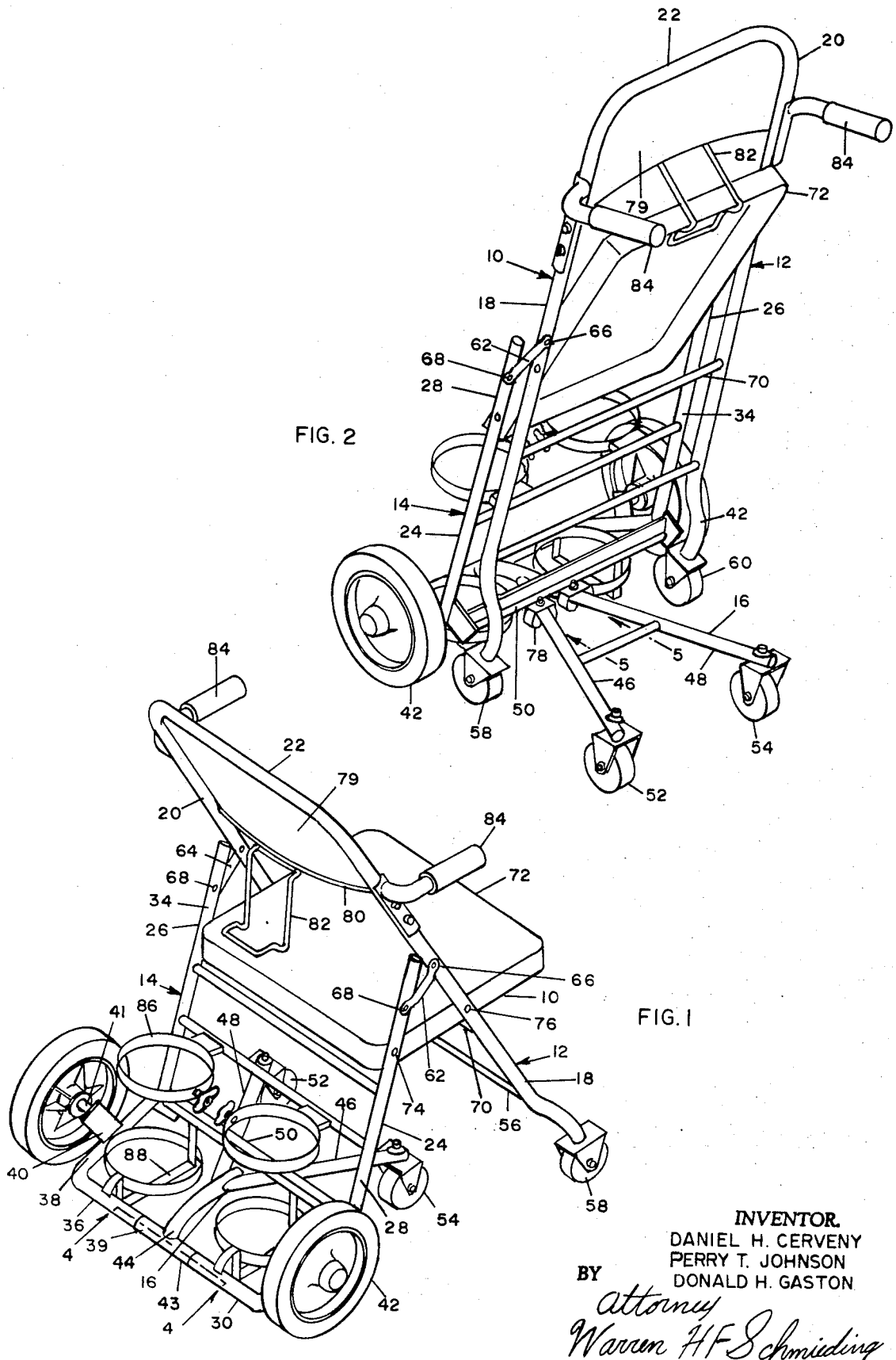
FIG. 1 is a perspective view of the cart when it functions as a seat for an occupant.
FIG. 2 is a perspective view of the cart when the front and rear frames are in partly folded position but in a stabilized position.

The cart 10 includes three frames, to wit: a front frame 12, a rear frame 14 and a stabilizing frame 16. Front frame 12 has an inverted U-shape including a right leg 18, a left leg 20, and a yoke 22.

Figure 4:
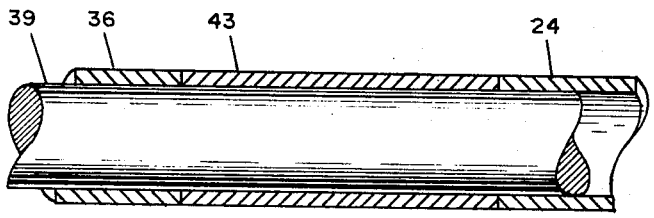
FIG. 4 is a fragmentary sectional view taken along line 4—4 of FIG. 1.
Figure 5:
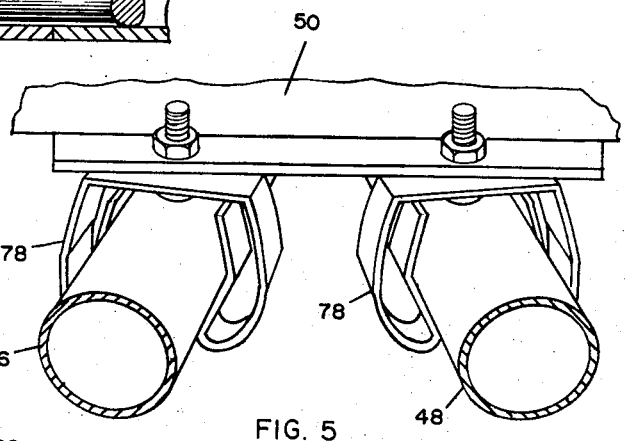
FIG. 5 is a fragmentary sectional view take along line 5—5 of FIG. 2.

The rear frame 14 includes two sections; namely, a right section 24 and a left section 26. These sections 24 and 26 are formed from tubing, the tube 24 having an upright portion or leg 28, a lower horizontal portion 30 and an intermediate portion which extends rearwardly and downward from upright portion 28. Tube 26 is allochiral with respect to tube 24 in that it includes an upright portion or leg 34, a lower horizontal portion 36 and an intermediate portion 38. A rod or pipe 39 (see FIG. 4) interconnects the confronting ends of the lower portions 30 and 36 of the sections to form a yoke for the rear frame 14, and also to form a horizontally extending bearing. The intermediate portions each has welded thereto an axle support 40 and these supports each carry an axle 41 for rear wheels 42.

The stabilizing frame 16 is Y-shaped including a yoke 43 which is journaled on the rod 39, an extension 44 and two outwardly extending legs 46 and 48. A horizontally extending brace 50 is engaged by the legs 46 and 48. The ends of the legs carry rollers 52 and 54, respectively.

Referring more in detail to the front and rear frames 12 and 14, the lower ends of legs 18 and 20 of frame 12 are interconnected by a brace 56, an the ends of those legs are supported respectively by rollers 58 and 60. Links 62 and 64 connect the front frame 12 with rear frame 14, the links being connected to intermediate portions of the legs 18 and 20 of the front frame by pivots 66 and to the upper portions of legs 24 and 26 of the rear frame by pivots 68. The right leg 24 of the rear frame is aligned rearwardly with the right leg 18 of the front frame, and the left leg 26 of the rear frame is aligned rearwardly with the left leg 20 of the front frame. The tops of the legs of the rear frame form abutments which are engaged by the rear sides of front legs 18 and 20 when the frames are spread to the position shown in FIG. 1 and thereby limit further spreading of the frames.

A second brace 70 interconnects the legs of the front frame 12. A seat 72 has its rear portion pivotally attached to the legs 28 and 34 of the rear frame by pivots 74 and its intermediate portion attached to the legs 18 and 20 of the front frame by pivots 76. This seat rests upon the brace 70 when the seat is in occupant-supporting position as shown in FIG. 1.

A back rest 79 spans and is suitably attached to the legs 18 and 20 of the front frame. A brace 80 is disposed below the back rest and a seat retainer 82 is pivotally connected with the brace 80. This retainer can be swung to the position shown in FIG. 2 for retaining the seat 72 in its folded position. Handlebars 84 are suitably fixed to the legs 18 and 20 of the front frame.

The stabilizing frame 16 can be swung to its forward position as shown in FIG. 1. Resilient and flexible latch mechanisms 78 are carried by the underside of brace 50 (see FIG. 2) for retaining the frame 16 in the position shown in FIGS. 1 and 2.

Figure 3:
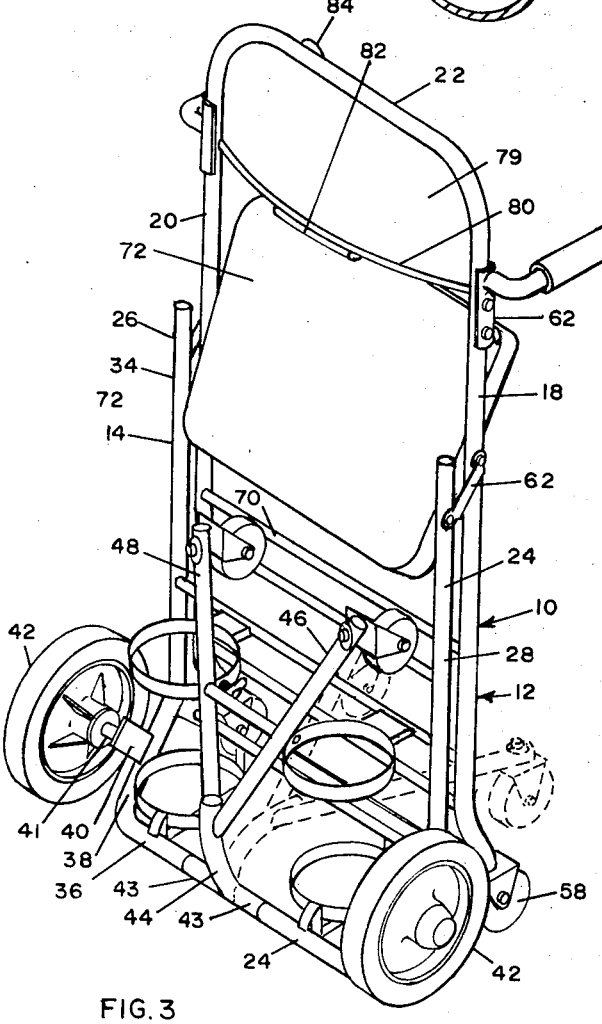
FIG. 3 is a perspective view of the cart when in a stored position.

The stabilizing frame has no function to perform when the cart is in the occupant-supporting position shown in FIG. 1, it being supported by the latch 78, but it is used to stabilize the cart when it is temporarily not in use. Such stabilizing is shown in FIG. 2. When the cart is to be stored or shipped, the stabilizing frame is swung to the position shown in FIG. 3. It will be observed from that FIG. that the cart occupies minimal space.

Applicants' invention is a multipurpose cart, but has been designed particularly for moving patients who require oxygen to facilitate breathing. To accomplish this particular need, the rear frame 14 has two sets of superimposed rings 86 welded thereto for retaining oxygen tanks (not shown). These tanks are supported by metal strips 88 that are suitably welded to the lower portions 30 and 36 of sections 24 and 26, respectively, and the brace 50.

The frames 12, 14 and 16 are formed of metal tubings and the braces are welded to these tubings. A magazine rack can be carried by the underside of the seat.

From the foregoing it is readily apparent that by virtue of the present invention, there has been provided a cart particularly suitable for use by invalids having need for oxygen, which cart can be readily folded to occupy minimal space and which can be moved readily from its folded position to an occupant-supporting position. The cart also can be moved readily from its folded position or from its occupant-supporting position to a semi-folded position, in which latter position it is stabilized in an upright position.

Too, the frames of the cart are formed of metal tubing to which braces, etc., can be readily welded resulting in a sturdy structure that can be manufactured at a relatively low cost.

Having defined our invention, we claim:

1. A foldable cart, comprising in combination:
   A. a front frame including:
      1. legs at opposite sides thereof,
      2. roller means carried at the lower ends of the legs;
   B. a rear frame including:
      1. legs on opposite sides thereof,
      2. a yoke interconnecting the lower portions of the legs of the rear frame,
      3. axle means attached to the legs of the rear frame,
      4. a stop intermediate the legs of the rear frame;
   C. wheels on the axle means;
   D. means for pivotally attaching the front frame to the rear frame;
   E. a seat;
   F. means for pivotally attaching the rear portion of the seat to the rear frame;
   G. means for pivotally attaching the seat intermediate the front and rear thereof to legs of the front frame;
   H. a third frame including:
      1. leg means,
      2. roller means connected to the outer portion of the leg means;
   I. means for pivotally connecting the opposite ends of the leg means to the yoke of the rear frame, said leg means being movable to opposite sides of the front frame whereby the roller means on the third mentioned frame can function as such;
   J. a latch attached to the stop on the rear frame for retaining the leg means of the third mentioned frame in fixed position when the leg means extends toward the front frame.

2. A foldable cart as defined in claim 1, characterized in that the roller means on the legs of the front frame comprise a roller disposed on the lower end of each leg.

3. A foldable cart as defined in claim 1, characterized in that the stop comprises a brace between the legs of the rear frame.

4. A foldable cart as defined in claim 1, characterized to include:
   K. a brace between the legs of the front frame;
   L. means pivotally mounted on the brace for latching the seat in an upright position.

5. A foldable cart as defined in claim 1, characterized in that the leg means of the third mentioned frame includes two legs that are connected with the yoke of the rear frame.

6. A foldable cart as defined in claim 1, characterized in that the upper portions of the legs of the rear frame form abutments that are adapted to engage the legs of the front frame to limit the spreading of the front and rear frames when the said frames are moved to position for supporting a person on the seat.

* * * * *